May 23, 1961  H. L. HOCKEL  2,985,155
AIR-COOLED INTERNAL COMBUSTION ENGINES
Filed June 8, 1959
Fig. 1
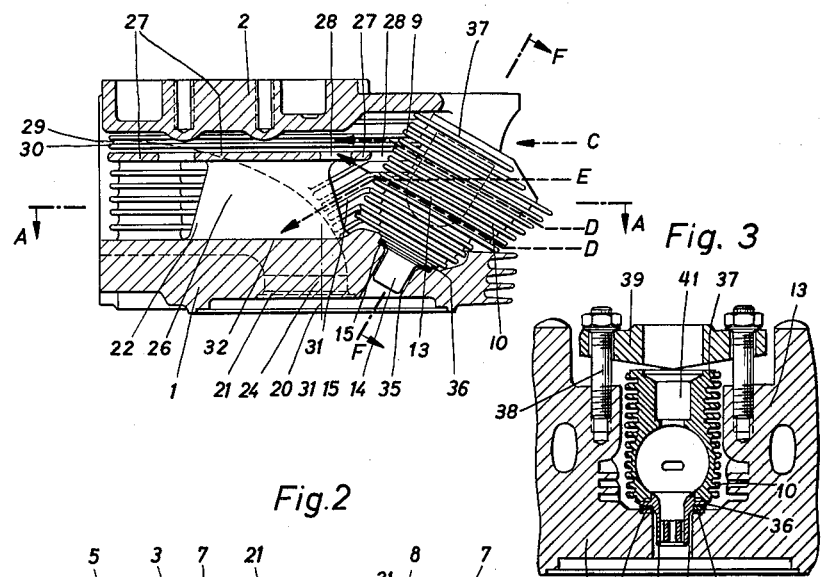
Fig. 3
Fig. 2
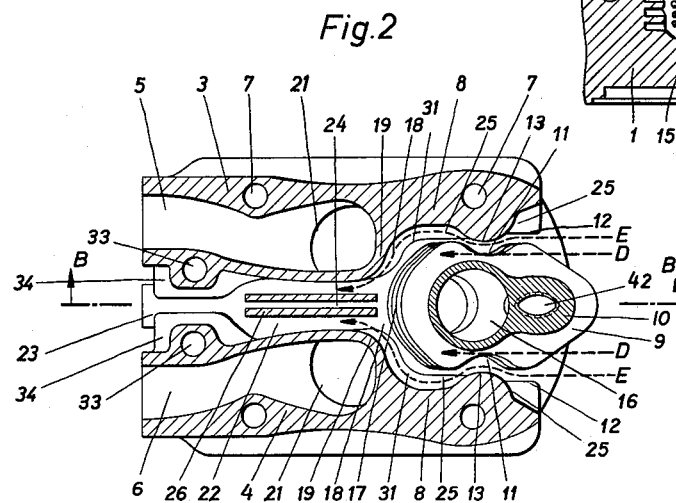

United States Patent Office 2,985,155
Patented May 23, 1961

2,985,155
AIR-COOLED INTERNAL COMBUSTION ENGINES
Hans Ludwig Hockel, Mannheim-Freudenheim, Germany, assignor to Motoren-Werke Mannheim A.G. vorm. Benz Abt. Stat. Motorenbau, Mannheim, Germany, a German company Filed June 8, 1959, Ser. No. 818,590
4 Claims. (Cl. 123—41.69)

The invention relates to air cooled internal combustion engines and is particularly concerned with air cooled cylinder heads for such engines. The invention has particular application in the case of an air cooled cylinder head which is provided with an auxiliary combustion chamber for the engine.

It is an object of the present invention to provide such an air cooled cylinder head having such an auxiliary combustion chamber with means for ensuring adequate and efficient air cooling of the combustion chamber and all those portions of the cylinder head which require to be cooled.

According to the present invention there is provided in an air cooled internal combustion engine, an air cooled cylinder head having intake and exhaust valve ports formed therein and overlying a main combustion space of said engine and respectively communicating with intake and exhaust channels formed in said head, said head having a central portion adjacent said main combustion space and an upper portion constituting a rocker box for said engine, an air cooling channel formed in and extending across said central portion of said head between an air cooling inlet side of said head and an air cooling outlet side of said head, said cooling air channel lying between said intake and exhaust channels, said central portion and said upper portion, said central portion separating said intake port and channel from said exhaust port and channel, an auxiliary combustion chamber, means mounting said chamber in relatively poor heat conducting relationship with said air inlet side of said head, guide walls on said air inlet side of said head in spaced relationship with and partially surrounding said auxiliary chamber so that a first portion of an air cooling stream directed towards said air inlet side is directed onto said combustion chamber so as to cool said combustion chamber, whilst a second portion of said stream flows around said chamber within said guide walls without being appreciably heated by said chamber, means for directing said first portion into said cooling air channel in the vicinity of said upper portion, and means for directing said second portion into said cooling air channel in the vicinity of said central portion thereby to cool said central portion.

For a better understanding of the invention and to show how the same may be carried into effect reference will now be made to the accompanying drawings, in which:

Figure 1 is a longitudinal sectional elevation of an air cooled cylinder head in accordance with the present invention and taken along the line B—B of the view shown in Figure 2, Figure 2 is a cross-sectional view of the air cooled cylinder head taken along the line A—A in Figure 1, and Figure 3 is a sectional view of the cylinder head and auxiliary combustion chamber taken along the line F—F in Figure 1.

Referring to the drawings the cylinder head is of box-like formation having a base plate 1 and upper portion 2 which serves as a rocker box. The upper portion 2 and the base plate 1 are rigidly linked by connecting walls 3 and 4 in which are respectively formed the exhaust passage 5 and the intake passage 6 which respectively communicate with exhaust and intake ports 21 formed in the base plate 1. In the constructional example shown, the walls 3 and 4 have passages 7 for fixing bolts (not shown) which secure the cylinder head to the cylinder (likewise not shown). The connecting walls 3 and 4 terminate at an air inlet side of the head, that is at the arrival side of cooling air coming in the direction of the arrow C, in guide walls 8, which partially surround an auxiliary combustion chamber 10, provided with cooling fins 9, fin free gaps being disposed between the chamber 10 and the guide walls 8. The combustion chamber 10 is mounted in a relatively poor heat conducting relationship with said head by two bolts 38 (see Figure 3) screwed in the reinforcements 13 and which cause the chamber 10 to press on to an insert 14, which in its turn rests on a heavy metal ring 15. The cylinder head is made of light metal, but individual, highly stressed parts amy be made of heavy metal. The guide walls 8 define two first cooling air passages 12, which extend in the dierction of flow fo the cooling air and on the lee side 17 of the combustion chamber 10 terminate in second cooling air passages 18 which extend athwart the direction C of the incoming cooling air and lead substantially to the centre of the cylinder head. Apart from the places at which it is deflected by the cooling fins 9 or by the walls 19, which define the second cooling air passages 18, the cooling air flows at right angles to the cylinder axis 20 and parallel to a plane of symmetry extending between the ports 21 and corresponding to the plane of section B—B. The second cooling air passages 18 terminate in a first cooling air channel 22, which lies between the exhaust and intake channels 5 and 6 and terminates at the cooling air outlet side 23. The guide walls 8 are provided with cooling fins 25, which in their longitudinal dimension extend parallel to the main direction C of cooling air flow, and in their transverse dimension, perpendicularly to the cylinder axis 20. The part of the base plate 1 forming the central portion 24 between the ports 21 is provided with one or more cooling fins 26, which in their longitudinal direction extend parallel to the principal direction of flow of the cooling air, and in their transverse dimension, extend in a plane parallel to the cylinder axis 20. On their side facing away from the base plate 1, the cooling fins 26 pass into a connecting web 27, which is arranged between the passages 5 and 6, and which extends in its longitudinal dimension parallel to the principal direction of flow of the cooling air and in its transverse dimension perpendicular to the cylinder axis 20. The web 27 is provided with openings 28. The cooling fins 9, protruding from the walls of the combustion chamber 10 have their guide surfaces inclined to the main direction of flow of the cooling air, so that the heated cooling air engaged by them is deflected away from the central portion 24 towards the upper part 2 into a second cooling air channel 29. This portion of the cooling air can also flow through one of the openings 28. The second cooling air tunnel 29 is arranged between the web 27 and the upper part 2. The cooling air channel 29 is provided with short fins 30 which, in their longitudinal dimension, extend parallel to the principal direction of flow of the cooling air, and in their transverse dimension extend in a plane perpendicular to the cylinder axis only so far as to leave a space, not shown, free from cooling fins. The walls 19, defining the second cooling air passages 18 are provided with fins 31, the guide surfaces of which are directed downwards on to a part 32 of the lower plate on which the central portion 24 is situated. If the guide walls 8 are provided with cooling fins 25, the fins 31 may form a continuation of the fins 25. The fin-free gaps 11 extend in a direction towards the walls 19, so that the intense, relatively cold cooling air stream occurring in said gaps is deflected in the direction of the arrows E and is led into the first cooling air tunnel 22, that is to say, into the gaps between the fins 26. By this means, the part 32 of the central portion 24, which particularly requires to be cooled, is supplied with less-heated cooling air, while the cooling air which has been strongly heated by coming into contact with the hot combustion chamber 10 flows away through the second cooling air tunnel 29 in the direction of the arrows D, where it no longer has to exercise any particular cooling effect. In the constructional example shown, the valve rods, not shown, pass through the holes 33. These places are provided with fins 34, which in their longitudinal dimension extend parallel to the principal direction of flow of the cooling air, and in their transverse dimension, extend in a plane parallel to the cylinder axis 20. The auxiliary combustion chamber 10 and the insert 14 are extensively thermally insulated from the actual cylinder head, particularly from the base plate 1. The hot insert 14 is thermally insulated by a cylindrical air gap 35 from the base plate 1 and is in heat-conducting connection with the plate 1 only by the ring 15, and the sealing ring 40 between the ring 15 and the collar 36 of the insert 14 is able to prevent the transmission of heat. The previously mentioned bolts 38, screwed into the reinforcements 13 engage by the bridge 39 the only slightly heated upper part 37 of the combustion chamber, so that no appreciable heat transmission from the combustion chamber to the cylinder head and particularly to the central portion 24 can take place on that path. The combustion chamber 10 has substantially spherical walls, which enclose the actual combustion space 10 and merge into an injection nozzle seating 41 and a glow bulb seating 42.

The construction of the auxiliary combustion chamber and its insert is described fully in the specification of United States patent application Ser. No. 653,922.

I claim:

1. In an air cooled internal combusion engine, an air cooled cylinder head having intake and exhaust valve ports formed therein and overlying a main combustion space of said engine and respectively communicating with intake and exhaust channels formed in said head, said head having a central portion adjacent said main combustion space and an upper portion constituting a rocker box for said engine, an air cooling channel formed in and extending across said central portion of said head between an air cooling inlet side of said head and an air cooling outlet side of said head, said cooling air channel lying between said intake and exhaust channels, said central portion and said upper portion, said central portion separating said intake port and channel from said exhaust port and channel, an auxiliary combustion chamber, means mounting said chamber in relatively poor heat conducting relationship with said air inlet side of said head, guide walls on said air inlet side of said head in spaced relationship with and partially surrounding said auxiliary chamber so that a first portion of an air cooling stream directed towards said air inlet side is directed onto said combustion chamber so as to cool said combustion chamber, whilst a second portion of said stream flows around said chamber within said guide walls without being appreciably heated by said chamber, means for directing said first portion into said cooling air channel in the vicinity of said upper portion, and means for directing said second portion into said cooling air channel in the vicinity of said central portion thereby to cool said central portion.

2. An air cooled cylinder head according to claim 1, wherein the means for directing said second portion comprises fins protruding from the guide walls, these fins lying in planes inclined to the cylinder axis and pointing towards said central portion.

3. An air cooled cylinder head according to claim 1, wherein said head is of box-like formation having a base plate in which said ports are formed and the upper portion constituting the rocker box for said engine, said base plate and upper portion being rigidly linked by connecting walls in which are respectively formed said intake and exhaust channels, said central portion constituting a central portion of said base plate and being disposed between said connecting walls, said auxiliary chamber communicating with said main combustion space via a restricted passage, said guide walls being formed integrally with said connecting walls and extending in the desired direction of the incoming cooling air stream, said guide walls defining first cooling air passages together with the walls of said combustion chamber, the walls of said intake and exhaust channels together with a wall portion on the lee side of said combustion chamber forming second cooling air passages extending athwart to the direction of the incoming cooling air, said first passages leading into said second passages, said auxiliary combustion chamber having fins lying in planes inclined to the cylinder axis and protruding from said combustion chamber walls, said planes pointing towards said rocker box, the guide walls and the tips of said combustion chamber fins defining two slots free of fins leading towards said second cooling air passages, said second cooling air passages leading into said cooling air channel.

4. An air cooled cylinder head according to claim 3, in which said restricted passage is formed by an insert, said insert having a flange clamped between the lower face of said auxiliary combustion chamber and said base plate by means of bolts engaging with the upper part of said combustion chamber, said bolts being screwed into projections protruding from said guide walls, said insert being surrounded by an air gap on the surface adjacent the base plate.

References Cited in the file of this patent

FOREIGN PATENTS 862,076    Germany _____ Jan. 8, 1953